United States Patent [19]
Johnson

[11] Patent Number: 5,280,386
[45] Date of Patent: Jan. 18, 1994

[54] WINDSHEILD DEFLECTOR SHEILD WITH LENS AND/OR REARVIEW MIRRORS

[75] Inventor: Douglas P. Johnson, Kent, Wash.

[73] Assignee: Paccar Inc., Bellevue, Wash.

[21] Appl. No.: 737,792

[22] Filed: Jul. 10, 1991

Related U.S. Application Data

[63] Continuation of Ser. No. 495,684, Mar. 19, 1990, abandoned.

[51] Int. Cl.⁵ .................. G02B 5/04; G02B 5/08; B60J 1/20
[52] U.S. Cl. ................... 359/509; 359/720; 359/742; 359/837; 359/855; 296/180.1; 296/91
[58] Field of Search ............ 350/582, 584, 627, 452, 350/612, 616, 286, 287; 296/84.1, 91, 95.1, 180.1; 359/507, 509, 720, 742, 831, 837, 850, 855, 866, 869, 871

[56] References Cited

U.S. PATENT DOCUMENTS

| | | | |
|---|---|---|---|
| T861,037 | 4/1969 | Christensen | 350/319 |
| 1,410,186 | 3/1922 | Jassen | 248/480 |
| 1,533,937 | 4/1925 | Mogor . | |
| 1,562,335 | 11/1925 | Jones . | |
| 1,578,629 | 3/1926 | Beauchamp . | |
| 1,683,951 | 9/1928 | Buttron | 350/287 |
| 1,731,284 | 10/1929 | Andel et al. | 350/287 |
| 1,837,085 | 12/1931 | Van Gelder . | |
| 1,918,802 | 7/1933 | Fleischer . | |
| 1,946,230 | 2/1934 | Mosberg | 88/1 |
| 2,039,474 | 5/1936 | Brunette | 88/93 |
| 2,100,938 | 11/1937 | Brandt | 88/98 |
| 2,116,757 | 5/1938 | Gould | 88/86 |
| 2,739,509 | 3/1956 | Hertz | 88/86 |
| 2,783,683 | 3/1957 | Maurer | 88/86 |
| 2,857,810 | 10/1958 | Troendle | 88/87 |
| 2,976,763 | 3/1961 | Anderson | 88/87 |
| 3,015,517 | 1/1962 | Thornburgh | 296/91 |
| 3,252,377 | 5/1966 | Kentes | 88/87 |
| 3,560,044 | 2/1971 | Helm | 296/91 |
| 3,667,369 | 6/1972 | Smith | 350/584 |
| 3,767,292 | 10/1973 | Rutkowski | 350/293 |
| 3,831,696 | 8/1974 | Mittendorf et al. | 180/68 |
| 3,972,596 | 8/1976 | Baumgardner et al. . | |
| 4,013,351 | 3/1977 | Haile | 350/293 |
| 4,033,245 | 7/1977 | DeRees | 98/2.12 |
| 4,134,612 | 1/1979 | Nelson | 296/91 |
| 4,153,129 | 5/1979 | Redmond | 180/68 |
| 4,364,596 | 12/1982 | Geisendorfer | 296/91 |
| 4,436,372 | 3/1984 | Schmidt et al. | 350/293 |
| 4,526,446 | 7/1985 | Adams | 350/624 |
| 4,627,657 | 12/1986 | Dansels et al. | 296/91 |
| 4,629,296 | 12/1986 | White | 350/624 |
| 4,822,157 | 4/1989 | Stout | 350/629 |

FOREIGN PATENT DOCUMENTS

| | | | |
|---|---|---|---|
| 818287 | 7/1969 | Canada | 296/81 |
| 520195 | 3/1931 | Fed. Rep. of Germany | 350/286 |
| 236011 | 7/1925 | United Kingdom | 350/287 |
| 0380146 | 9/1932 | United Kingdom . | |
| 748491 | 5/1956 | United Kingdom | 350/287 |

*Primary Examiner*—Bruce Y. Arnold
*Assistant Examiner*—R. D. Shafer
*Attorney, Agent, or Firm*—Seed and Berry

[57] ABSTRACT

The invention relates to a windshield deflector shield for deflecting insects and debris above the hood and windshield of a vehicle and for increasing the driver's field of vision. The deflector shield includes a lens coupled to the middle deflector section for increasing the field of vision in front of the vehicle. The deflector shield may also include rearview mirrors coupled to the ends of the deflector shield for increasing the driver's field of vision at the sides of the vehicle.

12 Claims, 2 Drawing Sheets

WINDSHEILD DEFLECTOR SHEILD WITH LENS AND/OR REARVIEW MIRRORS

CROSS-REFERENCE TO RELATED APPLICATION

This application is a continuation of U.S. application Ser. No. 07/495,684 filed Mar. 19, 1990, now abandoned.

TECHNICAL FIELD

This invention relates to a device for improving a driver's visibility through the windshield of a vehicle and the driver's field of vision. More specifically, this invention relates to a device for deflecting debris over a hood and windshield of a vehicle and for improving the driver's field of vision in front and at the sides of the vehicle.

BACKGROUND OF THE INVENTION

Providing the driver of a vehicle with the best possible view and the maximum field of vision from the driver's seat has long been a primary concern in the manufacturing of vehicles. The cab portion of a vehicle typically has many windows, including a front windshield, side windows, and a back window, which provide a view of all directions surrounding the vehicle. Nevertheless, the driver spends most of his time looking through the windshield to observe the road and other objects in the path of the vehicle.

A problem encountered in the operation of a vehicle is maintaining the windshield free from debris that gathers on the windshield's outer surface as the vehicle travels down the road. Frequently insects, road debris, and other airborne objects impact and collect upon the windshield. As the debris accumulates on the windshield, the driver's visibility through the windshield becomes increasingly impaired. This problem becomes even more acute when the vehicle is driven over long distances at highway speeds.

Deflector shields, such as those shown in U.S. Pat. Nos. 3,015,517 and 3,831,696, have been designed to minimize the collection of debris on a windshield. These deflector shields direct the airflow above the hood and windshield of a vehicle so that insects and other airborne debris pass over the hood and windshield, instead of impacting and collecting on the windshield. These deflectors have the adverse side effect of creating an additional obstacle in front of the vehicle which diminishes the driver's field of vision. Most of these deflectors are made, however, of a transparent, see-through material to minimize this adverse effect.

Another problem vehicle operators have commonly faced is the difficulty of observing low-profile objects immediately in front of the vehicle. Normally, the driver cannot see what, if any, objects are located immediately in front of the vehicle because of the obstructed view created by the engine hood. This problem is magnified in the case of large, industrial-sized trucks because of the large engine and corresponding hood size. To be sure, the driver must take the time to get out and walk around to the front of the vehicle to determine if there are any objects in front of the vehicle.

Attempts have been made to improve the driver's range of vision in front of a motor vehicle by using a combination of mirrors, as shown in U.S. Pat. Nos. 1,918,802 and 4,436,372. Such mirror arrangements are complex and require mounting separate, multiple mirrors on the front of the vehicle.

Still another problem faced by vehicle operators is the difficulty of viewing objects at the sides of the vehicle. This problem has traditionally been solved by mounting standard side-view mirrors on the sides of the vehicle. Such arrangements require the driver to turn his head in the direction of the side he wishes to see and look into the particular mirror. This diverts the driver's attention from what is happening in front of the vehicle and can therefore be dangerous. In addition, a side-view mirror is usually mounted on each side of the vehicle which detracts from the vehicle's aerodynamic efficiency.

There have been other previous efforts to combine mirrors with a deflector shield to improve the driver's field of vision. For example, U.S. Pat. No. 2,783,683 shows a pair of mirrors mounted on a deflector shield to enable the driver to see around blind corners of intersections being approached by the vehicle.

SUMMARY OF THE INVENTION

The present invention provides a windshield deflector shield for deflecting insects and road debris above the hood and windshield of a vehicle and for improving the driver's field of vision. The deflector shield includes a lens coupled to a main deflector segment for increasing the driver's field of vision in front of the vehicle. In addition, the windshield deflector shield may also include mirrors attached to ends of the deflector shield to increase the driver's field of vision along the sides of the vehicle.

DETAILED DESCRIPTION OF THE INVENTION

Figure 1:
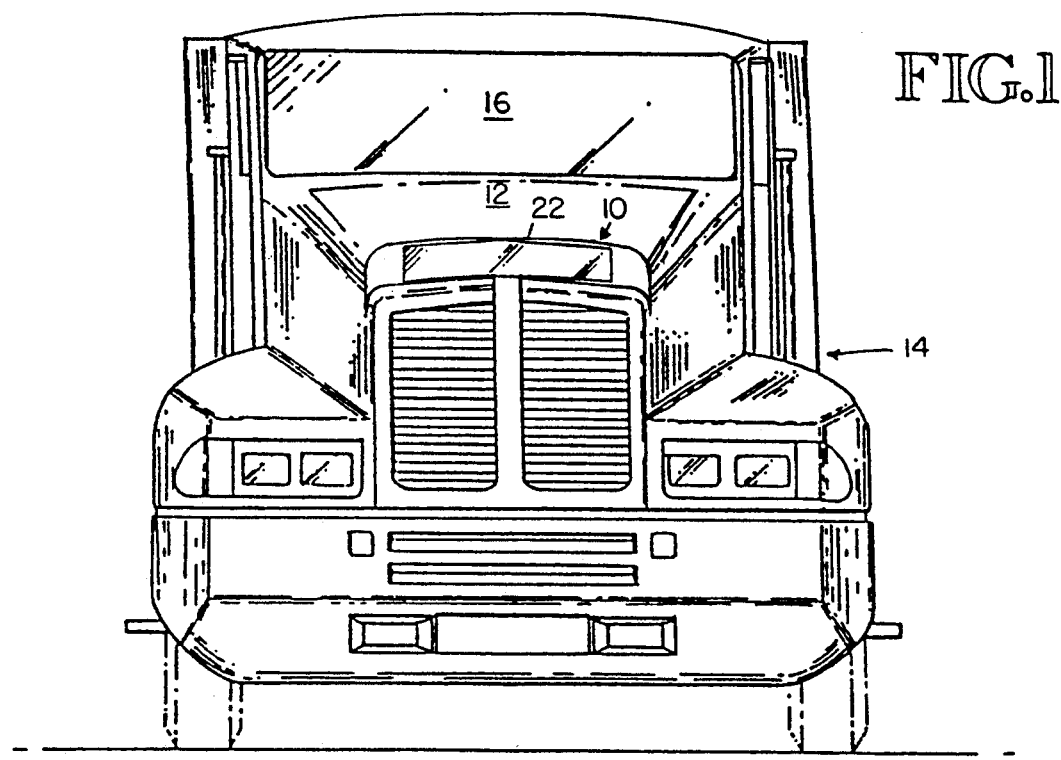
FIG. 1 is a front view of a vehicle including the windshield deflector shield of the present invention.
Figure 2:
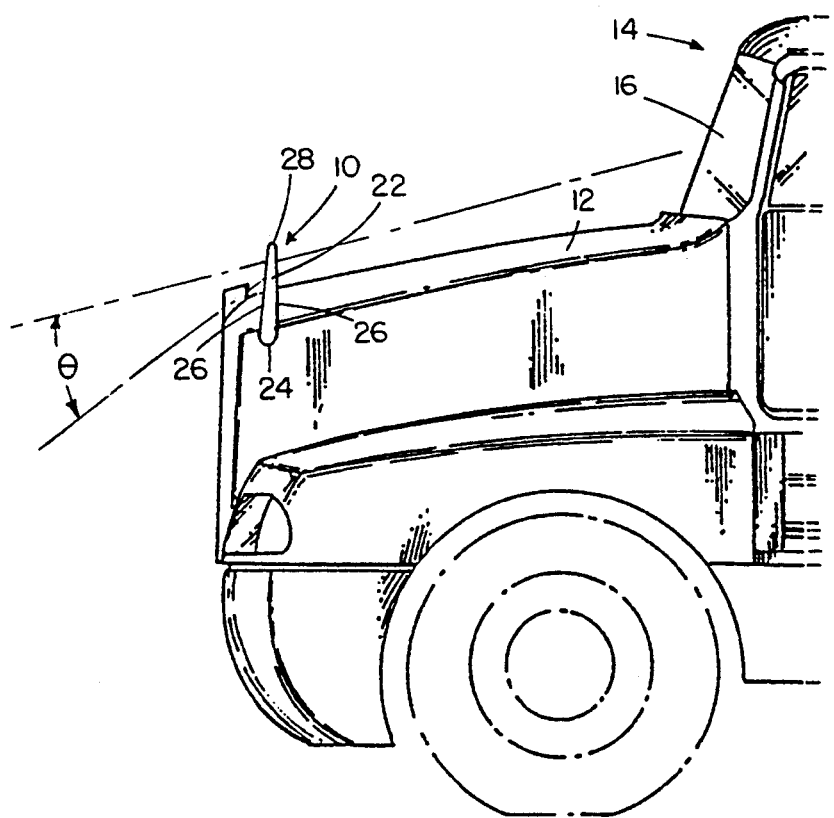
FIG. 2 is a side view of a vehicle including the windshield deflector shield of the present invention.

As shown in FIGS. 1 and 2, the invention involves a windshield deflector shield 10 mounted on a hood 12 of a vehicle 14. The deflector shield, best shown in FIGS. 3 and 4, comprises a main deflector segment 20 to which a lens 22 is connected. In one embodiment (FIG. 3), the lens is coupled to the center of the main deflector segment, which is made of a transparent see-through material 32. In an alternative embodiment (FIG. 4), the lens is coupled to the center of the main deflector segment and rearview mirrors 30 are also coupled to the main deflector segment on each side of the lens.

Referring again to FIGS. 1 and 2, the windshield deflector shield 10 is mounted to the front of a hood 12 of a vehicle 14 to deflect the airflow, including airborne objects such as insects and road debris, over the hood and windshield 16 of the vehicle. The deflector shield is preferably attached to the front portion of the hood, but could also be attached to the body of the vehicle so long as the deflector shield provides a continuation of the front surface of the vehicle for properly deflecting the airflow. Another reason the deflector shield is positioned at the front of the hood or vehicle is so that the lens 22 is capable of increasing the driver's field of vision of the area immediately in front of the vehicle. The means for securing the deflector shield to the hood or vehicle body can be any conventional securing means, including but not limited to bolts, rivets,, adhesives.

The length of the deflector shield 10 substantially corresponds to the width of the front of the hood 12 so that as much airflow as possible is directed over the hood 12 and windshield 16 of the vehicle. The height of the deflector shield is substantially less than the length of the deflector shield. The deflector shield should be only as high as is needed to effectively direct the airflow over the vehicle so that any obstruction of the driver's view is minimized. The main deflector segment 20 is preferably made of a transparent material 32 (FIG. 3), such as the material sold under the trademark PLEXIGLASS ™ to enable the driver to see through the deflector shield. Although the transparent material will allow the driver to see through the deflector shield, it will not enhance or improve the driver's field of vision of the area immediately in front of the vehicle. Accordingly, the lens 22 must be included as part of the deflector shield to increase the driver's field of vision.

Figure 3:
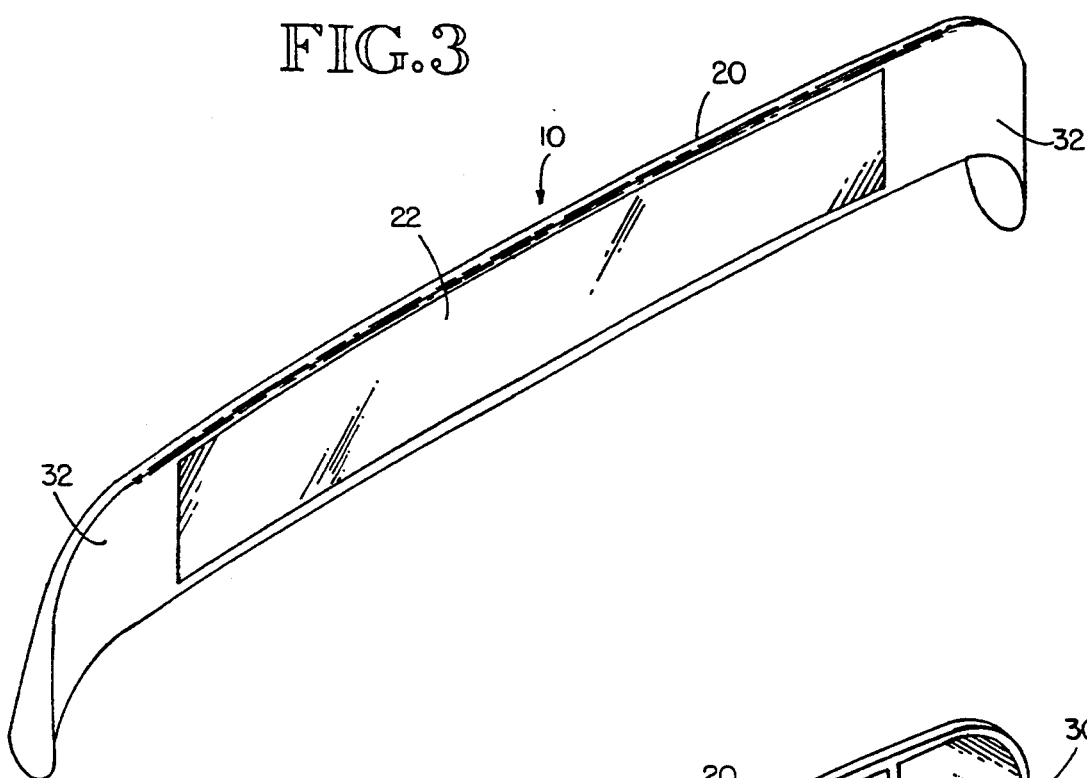
FIG. 3 is a perspective view of the invention.

Referring now to FIG. 3, a lens 22 is coupled to the main deflector segment 20 of the deflector shield 10 to increase the driver's field of vision in front of the vehicle. The increased field of vision, shown as angle (θ) in FIG. 2, enables the driver to view objects immediately in front of the vehicle which he could not otherwise see because of the engine hood. Therefore, when a driver is ready to move the vehicle from a stationary position, he can determine if any objects are located in front of the vehicle by simply looking through the lens, instead of having to exit and walk to the front of the vehicle.

As shown in FIG. 2, the lens 22 may have a wedge-shaped cross section which includes a wide base 24, opposite sides 26 extending upwardly of the base and converging to form a narrow top 28. It is to be understood, however, that lenses of any number of shapes and sizes may be used with the invention. The lens is preferably a wide-angle or Fresnel lens, to provide driver with the maximum possible field of vision in front of the vehicle.

Figure 4:
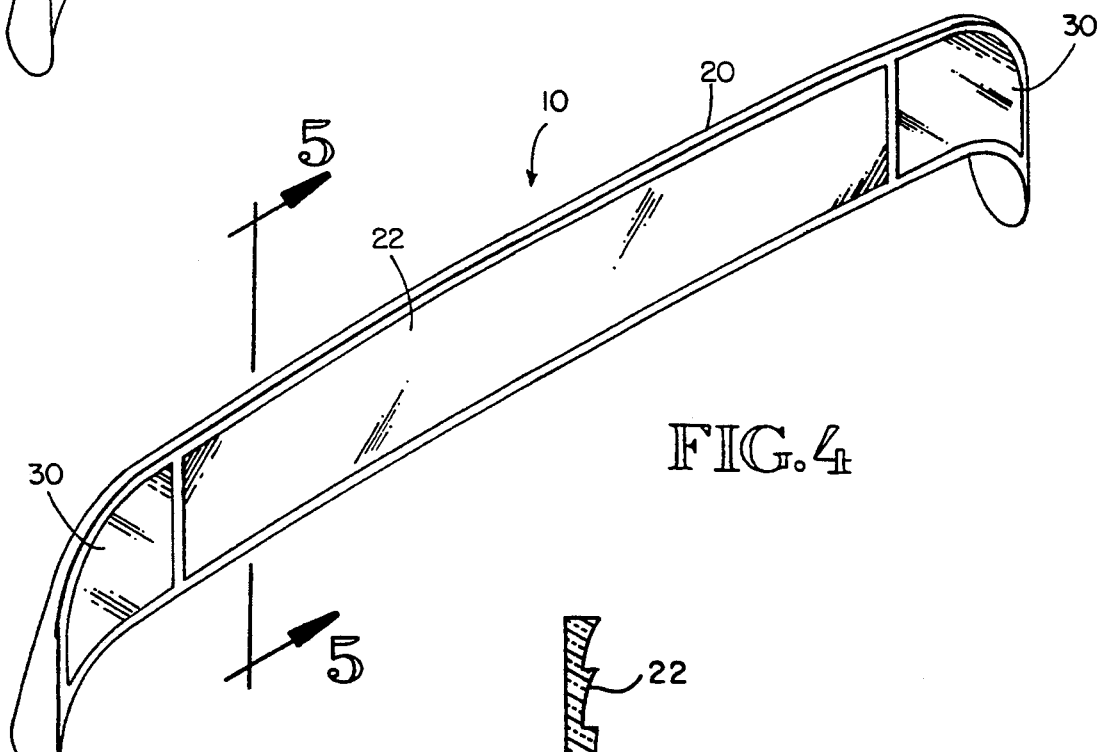
FIG. 4 is a perspective view of an alternative embodiment of the invention.
Figure 5:
FIG. 5 is a cross-section view of a fresnel lens taken along line 5—5 of FIG. 4.

An alternative embodiment of the invention is shown in FIG. 4, in which side-view mirrors 30 are coupled to each end of the deflector shield 10 to provide the driver with a rearview of the areas at the sides of the vehicle. This approach differs from the use of traditional side-view mirrors mounted on both sides of the vehicle which require the driver to move his head approximately 90 degrees to the right or left to view the particular side of the vehicle in which he has interest. In addition, the traditional approach requires the attachment of two separate side-view mirrors, one to each side of the vehicle, which increases the wind resistance of the vehicle and makes assembly of the vehicle more complex and expensive.

The positions of the mirrors coupled to the deflector shield are preferably fixed, although adjustable mirrors could also be used. Because the positions of the mirrors are preferably fixed, wide-angle mirrors may be used to maximize the driver's field of vision. While one embodiment of the invention shows a deflector shield with mirrors on both sides of the lens, it should be understood that there may be occasions when only one mirror is required to carry out the purpose of the invention.

Referring again to FIGS. 1 and 2, the mirrors 30 and the lens 22 are integrally coupled to the deflector shield 10 to provide a single, uniform surface of the deflector shield which contacts the airflow. This uniform surface improves the deflecting efficiency of the deflector shield. This combination also allows for a single member to be attached to the front of the hood, instead of having to attach individually a deflector shield, multiple mirrors, and a lens.

As described above, the invention provides a unique apparatus for deflecting debris over a vehicle and for increasing the driver's field of vision. While preferred embodiments of the invention have been illustrated and described, it should be understood that variations will be apparent to persons of ordinary skill in the art. Accordingly, the invention is not to be limited to the specific embodiments shown in the drawings.

I claim:

1. A windshield deflector shield for deflecting insects and road debris over a hood and a windshield of a vehicle and for improving the driver's field of vision, comprising:

a main deflector segment having a length and a height, the height being substantially less than the length of the main deflector segment, the length of the main deflector segment corresponding substantially to a width of a hood of a vehicle, the main deflector segment being mounted to the vehicle in front of a windshield of the vehicle;

a lens mounted in the main deflector segment for increasing the driver's field of vision in front of the vehicle; and a mirror coupled to an end of the main deflector segment to increase the driver's rearward field of vision at a side of the vehicle.

2. A windshield deflector shield for deflecting insects and road debris over a hood and windshield of a vehicle and for improving the driver's field of vision, comprising:

a main deflector segment having a length and a height, the height being substantially less than the length of the main deflector segment, the length of the main deflector segment corresponding substantially to a width of a hood of a vehicle, the main deflector segment being mounted to the vehicle in front of a windshield of the vehicle;

a lens mounted int he main deflector segment for increasing the driver's field of vision in front of the vehicle;

a mirror coupled to an end of the main deflector segment to increase the driver's rearward field of vision at a side of the vehicle; and wherein the lens and mirror are made as an integral part of the deflector shield to form a single, uniform surface of the deflector shield which contacts an airflow to minimize wind resistance and improve deflecting efficiency.

3. A windshield deflector according to claim 2 wherein the lens is a wide-angle lens.

4. A windshield deflector shield for deflecting insects and road debris over a hood and a windshield of a vehicle and for improving the driver's field of vision, comprising:

a main deflector segment having a length and a height, the height being substantially less than the length of the main deflector segment, the length of the main deflector segment corresponding substantially to a width of a hood of a vehicle, the main deflector segment being mounted to the vehicle in front of a windshield of the vehicle;

a lens mounted in the main deflector segment, the lens being oriented to allow the driver to view a ground-level area immediately in front of the vehicle to warn the driver of obstacles on a road surface immediately in front of the vehicle; and wherein the lens has a wedge-shaped, cross-sectional area comprising a wide base, sidewalls, and a narrow top, the sidewalls extending upwardly of the wide base and converging to form the narrow top surface.

5. A windshield deflector shield for deflecting insects and road debris over a hood and windshield of a vehicle and for improving the driver's field of vision, comprising:

a main deflector segment having a length corresponding substantially to a front width of a hood of a vehicle and having a height substantially less than the length of the deflector segment;

a lens coupled to the main deflector segment for increasing the driver's field of vision in front of the vehicle, the lens having a wedge-shaped, cross-sectional area comprising a wide base, sidewalls, and a narrow top surface, the sidewalls extending upwardly of the wide base and converging to form the narrow top surface; and a mirror coupled to an end of the main deflector segment to increase the driver's field of vision at a side of the vehicle.

6. A windshield deflector shield for deflecting insects and road debris over a hood and windshield of a vehicle and for improving the driver's field of vision, comprising:

a main deflector segment having a length corresponding substantially to a front width of a hood of a vehicle and having a height substantially less than the length of the main deflector segment;

a lens coupled to the main deflector segment for increasing the driver's field of vision in front of the vehicle, the lens having a wedge-shaped, cross-sectional area comprising a wide base, sidewalls, and a narrow top surface, the sidewalls extending upwardly of the wide base and converging to form the narrow top surface;

a mirror coupled to an end of the main deflector segment to increase the driver's field of vision at a side of the vehicle;

securing means coupled to the main deflector segment for securing the main deflector segment to the front of the vehicle; and wherein the lens is a wide-angle lens.

7. A windshield deflector shield for deflecting insects and road debris over a hood and windshield of a vehicle and for improving the driver's field of vision, comprising:

a main deflector segment having a length corresponding substantially to a front width of a hood of a vehicle and having a height substantially less than the length of the main deflector segment;

a lens coupled to the main deflector segment for increasing the driver's field of vision in front of the vehicle, the lens having a wedge-shaped, cross-sectional area comprising a wide base, sidewalls, and a narrow top surface, the sidewalls extending upwardly of the wide base and converting to form the narrow top surface;

a mirror coupled to an end of the main deflector segment to increase the driver's field of vision at a side of the vehicle;

securing means coupled to the main deflector segment for securing the main deflector segment to the front of the vehicle; and wherein the mirror is a wide-angle mirror.

8. A windshield deflector shield for deflecting insects and road debris over a hood and windshield of a vehicle and for improving the driver's field of vision, comprising:

a main deflector segment having a length and a height, the height being substantially less than the length, the main deflector segment being mounted to a forward portion of a vehicle so that the main deflector segment deflects an airflow resulting from forward movement of the vehicle, the main deflector segment being separate from and mounted in front of a vehicle windshield through which a driver looks to operate the vehicle while traveling in a forward direction; and a lens mounted in the main deflector segment, the lens being oriented to allow the driver to view a ground-level area immediately in front of the vehicle to warn the driver of obstacles on a road surface immediately in front of the vehicle.

9. The windshield deflector shield according to claim 8 wherein the length of the main deflector segment corresponds substantially to a width of a vehicle hood.

10. The windshield deflector shield according to claim 9 wherein the lens is a wide-angle lens.

11. The windshield deflector shield according to claim 9 wherein the lens is a fresnel lens.

12. The windshield deflector shield according to claim 9 wherein the deflector segment is mounted to a vehicle hood.

* * * * *